Nov. 6, 1923.
A. P. JURGENSEN
1,473,104
CREAM DIPPER
Filed March 15, 1923
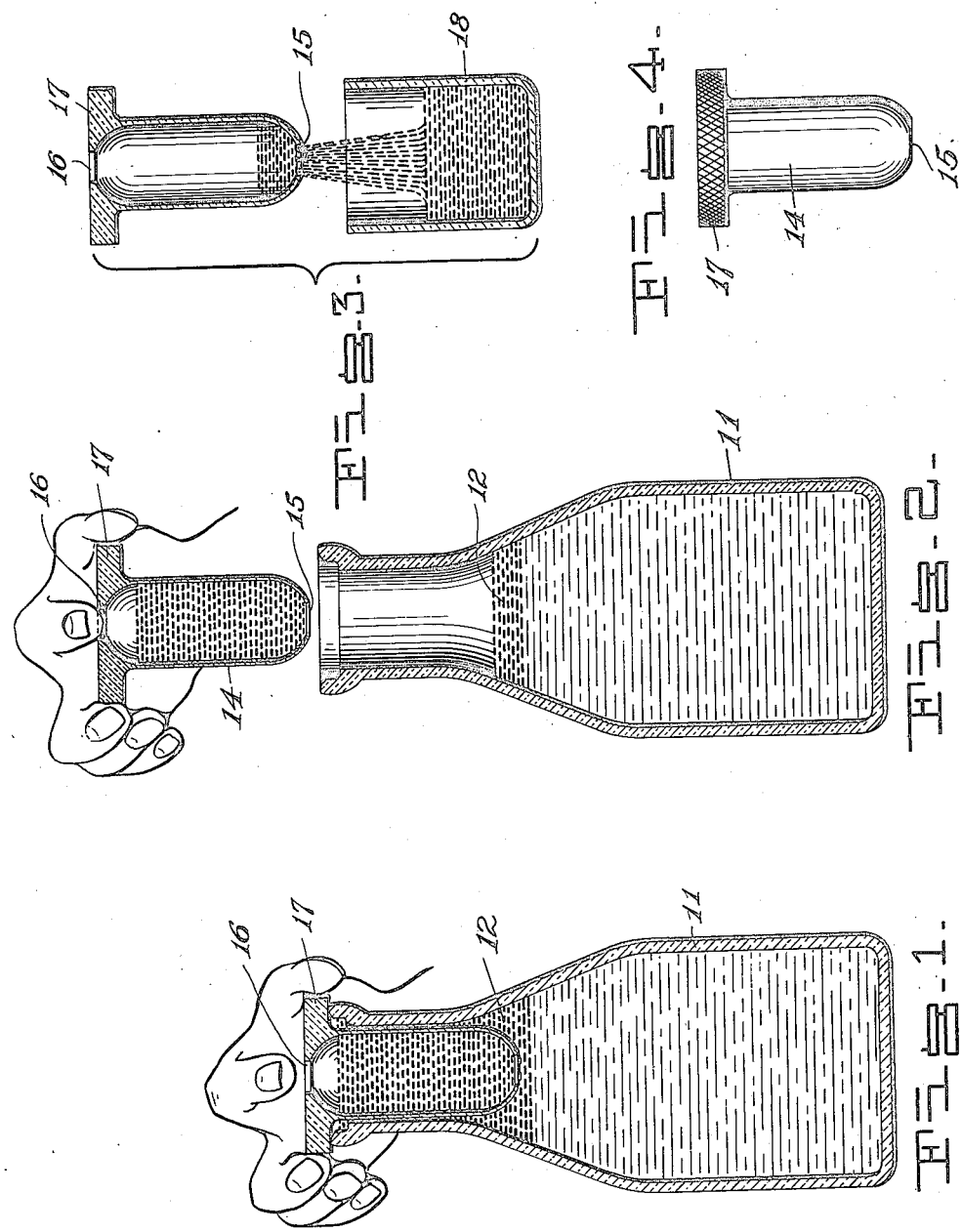
INVENTOR
August P. Jurgensen
BY
Frank & Kent
ATTORNEY Patented Nov. 6, 1923.

1,473,104

UNITED STATES PATENT OFFICE.

AUGUST P. JURGENSEN, OF NEW YORK, N. Y., ASSIGNOR TO ISIDOR GOLDBERG, OF BROOKLYN, NEW YORK.

CREAM DIPPER.

Application filed March 15, 1923. Serial No. 625,420.

*To all whom it may concern:*

Be it known that I, AUGUST P. JURGENSEN, a citizen of the United States, residing at New York, in the county of New York and State of New York, have invented certain new and useful Improvements in Cream Dippers, of which the following is a specification.

This invention relates to a device for removing the supernatant cream from a bottle of milk.

An object of the invention is to produce an article of this kind which is very simple and cheap to manufacture and which functions with the minimum of manipulation.

Other objects and aims of the invention, more or less broad than those referred to above, will be in part obvious and in part specifically referred to in the course of the following description of the elements, combinations, arrangements of parts, and applications of principles constituting the invention; and the scope of protection which is contemplated, will appear from the claims.

In the accompanying drawings, which are to be taken as a part of this specification, and in which I have shown for purposes of illustration, various forms of embodiment of the invention:

Fig. 1 is a view in vertical section, showing the cream dipper in the bottle, the finger of the user being out of contact with the opening at the top to permit air to escape while cream is flowing into the lower end of the dipper;

Fig. 2 is a view similar to Fig. 1, with the exception that the finger has been brought down to cover the opening at the top of the dipper;

Fig. 3 is a view showing the finger removed from the top opening of the filled dipper, and showing the contained cream escaping by gravity;

Fig. 4 is a side elevation of the dipper shown in Figs. 1, 2 and 3.

Referring to the numerals on the drawings, and first to Figs. 1 to 4 inclusive, I show at 11 an ordinary milk bottle, in which the cream layer is indicated by the heavy dash lines 12. The cream dipper or lifter which constitutes my invention is intended to be inserted into the bottle as shown, and comprises a tubular body portion 14, constricted at its lower end to provide a restricted opening 15, through which cream enters into and is discharged from the body. This body portion may be of glass or other satisfactory material, and in Figs. 1 to 4 is shown provided with a restricted top opening 16 of about the same size as opening 15, and with a flange 17 large enough to rest on the bottle mouth (Fig. 1), and so that the dipper may not accidentally drop into the bottle. The mode of operation is obvious from Figs. 1, 2 and 3. The tubular body portion is inserted into the bottle (Fig. 1) and the top opening 16 left uncovered, so that the cream layer 12 will enter the tube. The vent 16 is now covered by the finger of the user, and the device lifted out (Fig. 2), the cream contained in the tube 14 remaining therein, in accordance with well known principles, until it is desired to empty the dipper, as for instance into another receptacle 18, when it is only necessary to uncover opening 16 (Fig. 3). The flange 17 is the means by which the dipper is handled, and may have its outer periphery roughened as shown in Fig. 4.

I claim:

1. A cream dipper consisting of a tubular body with restricted end openings and having an integral projecting flange at the top of the tubular body for supporting it within a bottle mouth, the upper surface of the flange being in the plane of the upper end of the body.

2. A cream dipper consisting of a tubular body with restricted end openings and having an integral projecting flange at the top of the tubular body for supporting it within a bottle mouth, the upper surface of the flange being in the plane of the upper end of the body, both interior ends of the body being substantially spherical.

In testimony whereof I affix my signature.

AUGUST P. JURGENSEN.